(12) United States Patent
Jojic et al.

(10) Patent No.: US 8,843,430 B2
(45) Date of Patent: Sep. 23, 2014

(54) RECOMMENDATION SYSTEM

(75) Inventors: Oliver Jojic, Annandale, VA (US);
Manu Shukla, Sterling, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 300 days.

(21) Appl. No.: 13/277,482

(22) Filed: Oct. 20, 2011

(65) Prior Publication Data
US 2013/0103634 A1    Apr. 25, 2013

(51) Int. Cl.
*G06N 5/02*  (2006.01)
*G06Q 30/02*  (2012.01)

(52) U.S. Cl.
CPC ................................ *G06Q 30/02* (2013.01)
USPC ...................................... 706/52; 705/26.7

(58) Field of Classification Search
USPC ................................ 706/45, 46, 52
See application file for complete search history.

(56) References Cited

U.S. PATENT DOCUMENTS

2009/0100094 A1* 4/2009 Verdaguer et al. ........ 707/104.1
2010/0332440 A1* 12/2010 Brodsky ..................... 706/52

OTHER PUBLICATIONS

Deshpande, M. et al. Item-based top-N recommendation algorithms, ACM Transactions on Information Systems, vol. 22, No. 1 (Jan. 2004), pp. 143-177.*
Deshpande, et al. "Item-based top-N recommendation algorithms." ACM Transactions on Information Systems vol. 22 No. 1 (2004) pp. 143-177.*
Papagelis et al. "Qualitative analysis of user-based and item-based prediction algorithms for recommendation agents." Engineering Applications of Artificial Intelligence vol. 18 No. 7 (2005) pp. 781-789.*
Ahn, "A new similarity measure for collaborative filtering to alleviate the new user cold-starting problem," Information Sciences, 2008. 178(1): pp. 37-51.
Anand and Bharadwaj, "Utilizing various sparsity measures for enhancing accuracy of collaborative recommender systems based on local and global similarities," Expert Systems with Applications, 2011. 38(5), pp. 5101-5109.
Apache Foundation. Available from: http://mahout.apache.org/, pp. 1-3.
Bambini et al., "A Recommender System for an IPTV Service Provider: a Real Large-Scale Production Environment," Recommender Systems Handbook, 2011: p. 299-331. (I see pp. 1-16.).
Cantador et al., "Content-based recommendation in social tagging systems," Recommender Systems. 2010, Sep. 26-30, 2010, pp. 1-4.
Fu and Leng, "A Framework for Recommender Systems in E-Commerce Based on Distributed Storage and Data-Mining," 2010 International Conference on E-Business and E-Government, 2010, pp. 3502-3505.
Adomavicius and Tuzhilin, "Toward the Next Generation of Recommender Systems: A Survey of the State-of-the-Art and Possible Extensions," IEEE Transactions on Knowledge and Data Engineering, Jun. 2005. 17(6): p. 734-749.

(Continued)

*Primary Examiner* — Kakali Chaki
*Assistant Examiner* — Eric Nilsson
(74) *Attorney, Agent, or Firm* — Banner & Witcoff, Ltd.

(57) ABSTRACT

In one aspect, a recommendation system offers item recommendations to users based on one or more items known to be liked by the users. An item may be recommended to a user if a similarity indicator for the item, established by determining how much more likely than expected the user will like the item based on the user liking another item, exceeds a predetermined threshold. Multiple items may be recommended to a user based on relative similarity indicators.

24 Claims, 8 Drawing Sheets

(56) References Cited

OTHER PUBLICATIONS

Gong, "An Efficient Collaborative Recommendation Algorithm Based on Item Clustering," Advances in Wireless Networks and Information Systems, 2010. 72, pp. 381-387.

GroupLens Research. Available from: http://www.grouplens.org/node1/2, pp. 1-3.

Gunawardana and Shani, "A Survey of Accuracy Evaluation Metrics of Recommendation Tasks," The Journal of Machine Learning Research, 2009. 10, pp. 2935-2962.

Herlocker et al., "Evaluating collaborative filtering recommender systems," ACM Transactions on Information Systems (TOIS), Jan. 2004. 22(1), pp. 5-53.

Jiang and Wang, "Pagerank-Based Collaborative Filtering Recommendation," Information Computing and Applications, 2010. 6377, pp. 597-604.

Karypis, "Evaluation of Item-Based Top-N Recommendation Algorithms," Proceedings of the tenth international conference on Information and knowledge management. 2001, pp. 1-8.

Koren, "Factorization meets the neighborhood: a multifaceted collaborative filtering model," Proceeding of the 14th ACM SIGKDD international conference on Knowledge discovery and data mining. 2008, pp. 1-9.

Lekakos and Caravelas, "A hybrid approach for movie recommendation," Multimedia Tools and Applications, 2008. 36(1-2): p. 55-70.

Liang et al. "Collaborative Filtering Recommender Systems Using Tag Information," International Conference on Web Intelligence and Intelligent Agent Technology. 2008, pp. 59-62.

Melville and Sindhwani, "Recommender Systems," Encyclopedia of Machine Learning, 2010, Chapter No. 00338, pp. 1-9.

Miller et al., "MovieLens unplugged: experiences with an occasionally connected recommender system," Proceedings of the 8th international conference on Intelligent user interfaces. Jan. 12-15, 2003, pp. 263-266.

Musto, "Enhanced vector space models for content-based recommender systems," Recommender Systems. Sep. 26-30, 2010, pp. 361-364.

Ormándi et al., "Overlay Management for Fully Distributed User-Based Collaborative Filtering," Lecture Notes in Computer Science, 2010. 6271-6282.

Resnick and Varian, "Recommender systems," Communications of the ACM, 1997. 40(3), pp. 56-58.

Sarwar et al. "Item-based collaborative filtering recommendation algorithms," Proceedings of WWW '01 Proceedings of the 10th international conference on World Wide Web. May 1-5, 2001, pp. 285-295.

Schlieder, "Modeling Collaborative Semantics with a Geographic Recommender," Advances in Conceptual Modeling—Foundations and Applications, Nov. 6-9, 2007. 4802-4812.

Su and Khoshgoftaar, "A survey of collaborative filtering techniques," Advances in Artificial Intelligence, 2009.

Töscher et al., "Improved neighborhood-based algorithms for large-scale recommender systems," Proceedings of the 2nd KDD Workshop on Large-Scale Recommender Systems and the Netflix Prize Competition. Aug. 24, 2008, pp. 1-6.

Wang et al., "Probabilistic relevance ranking for collaborative filtering," Information Retrieval, 2008. 11(6), pp. 1-27.

Zhao and Shang, "User-based collaborative-filtering recommendation algorithms on hadoop," Third International Conference on Knowledge Discovery and Data Mining. 2010, pp. 478-481.

Jojic et. al., "A Probabilistic Definition of Item Similarity," RecSys '11 Proceedings of the Fifth ACM Conference on Recommender Systems, Oct. 23-27, 2011, pp. 229-236, ACM New York, NY, USA.

Extended European Search Report—EP 12189192.3—Mailing date: Feb. 12, 2013.

\* cited by examiner

RECOMMENDATION SYSTEM

BACKGROUND

Media content users often enter search queries to find content, such as television programs and movies. In most instances, however, users need to recall search keywords, such as content titles or actor names, in order to find a particular content. Furthermore, with more and more content becoming available, users are often overwhelmed by search results from their queries. The following disclosure identifies and solves shortcomings such as via a recommendation system that efficiently provides focused and accurate content recommendations to users.

BRIEF SUMMARY

Various features described herein may be used to provide a recommendation system. The system can, in one aspect, receive an identifier for a first item liked by a user and an identifier for a second item and determine, as a similarity indicator for the second item, how much more likely than expected the user will like the second item, based on the user liking the first item. In additional aspects, the system can determine that the similarity indicator for the second item is greater than a predetermined threshold and in response to determining that the similarity indicator for the second item is greater than the predetermined threshold, transmit a recommendation for the second item to the user.

In another embodiment, the system can receive an identifier for a third item, determine, as a similarity indicator for the third item, how much more likely than expected the user will like the third item, based on the user liking the first item, determine that the similarity indicator for the second item is greater than the similarity indicator for the third item, and in response to determining that the similarity indicator for the second item is greater than the similarity indicator for the third item, transmit a recommendation for the second item to the user.

In another aspect, a first item may be video content, and the system may determine the percentage of the video content consumed by the user, determine that the percentage of the video content played is greater than a predetermined like threshold, such as 80%, and in response to determining that the percentage of the video content played is greater than the predetermined like threshold, indicate, by the computing device, that the first item is liked by the user. In other aspects, the first item liked by the user may be a first video content viewed by the user on one or more video on demand sessions carrying the video content and the second item may be a second video content configured to be viewed on one or more video on demand session.

In another aspect, the system may determine, as a similarity indicator for a second item, a ratio of a number of users that like the first item and the second item to an expected number of users that like the first item and the second item. The system may also determine an accumulated probability that a set of users will like the second item, and based on the accumulated probability, determine the expected number of users that like the first item and the second item. In further aspects, determining the accumulated probability may include determining a probability that a user of the set of users will like the second item, the probability comprising the ratio of a number of instances that the user of the set of users likes the second item to the total number of instances for the user of the set of users and the second item for each user of the set of users and accumulating the probabilities for each user of the set of users. In additional aspects, determining the probability that a user of the set of users will like the second item may include determining a normalization factor, the normalization factor is based on a total number of items liked by the set of users and determining the probability that a user of the set of users will like the second item based on the determined normalization factor.

In another aspect, the system may receive an identifier for a third item liked by the user, determine, as a second similarity indicator for the second item, how much more likely than expected the user will like the second item, based on the user liking the third item, and determine an accumulated similarity indicator based on the similarity indicator and the second similarity indicator. In further aspects, the system may determine that the accumulated similarity indicator is greater than a predetermined threshold, and in response to determining that the accumulated similarity indicator for the second item is greater than the predetermined threshold, transmit a recommendation for the second item to the user.

The foregoing is only a summary, and these and other features are discussed further below.

DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Content (e.g., data, video, audio, audiovisual, etc.) may be recommended to users in many ways. In some embodiments, a recommendation system may recommend content based on content and/or user-related metadata (e.g., genre, actors, director, movie length, etc.). For example, a movie recommendation system may derive and store metadata for movies consumed by a user and recommend, to the user, movies having similar metadata as movies previously consumed by the user. If genre metadata is used, for example, a movie content recommendation system may recommend one or more romantic comedies to a user that previously watched and/or liked a romantic comedy. In other embodiments, a recommendation system may recommend content based on collaborative filtering. In these recommendation systems, recommendations for a particular user may be derived from an analysis of multiple users and/or content.

A user-based collaborative filtering recommendation system may match a particular user to one or more other users based on, for example, a determination of whether content consumed by the particular user matches content consumed by one or more other users. If a match is found, the recommendation system may recommend, to a particular user, content consumed by or recommended to a matching user. Item-based collaborative filtering is another example of a collaborative-based recommendation system. An item-based collaborative filtering system may match a particular item to one or more other items. Matches may be made, for example, by comparing users that have consumed a particular item to users that have consumed one or more other items. For example, if users that have consumed a first item substantially correspond to users that have consumed a second item, the item-based collaborative filtering recommendation system may recommend the second item to a particular user if the user liked or consumed the first item. Any of the previously described recommendation systems may be combined to form a combination recommendation system. Such a recommendation system may be based on both metadata and similarity between items.

Figure 1:
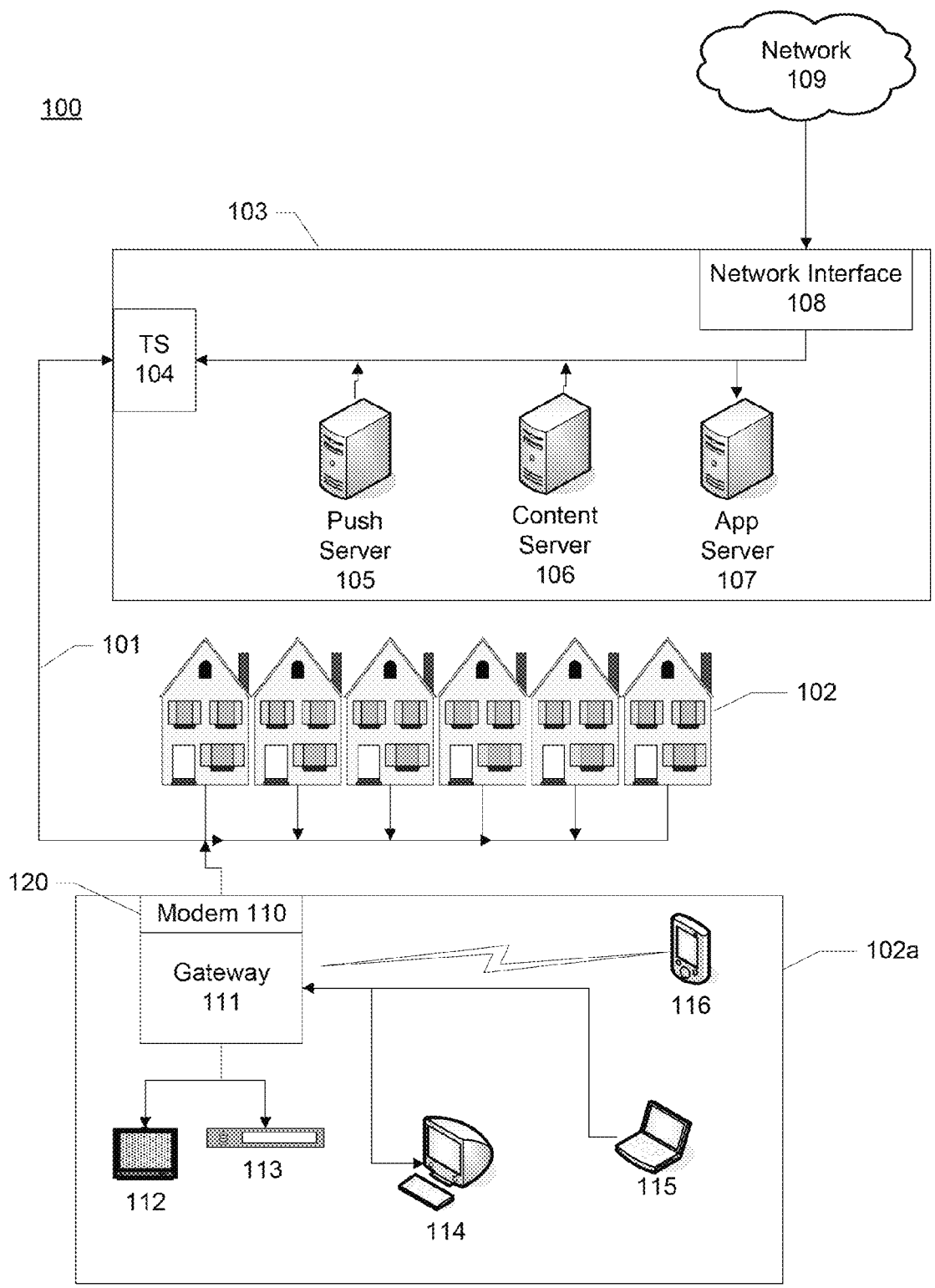
FIG. 1 illustrates an example communication network on which at least some of the various features described herein may be implemented.

FIG. 1 illustrates an example information distribution or access network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 may use a series of interconnected communication lines 101 (e.g., coaxial cables, optical fibers, wireless links, etc.) to connect multiple premises 102 (e.g., businesses, homes, consumer dwellings, etc.) to a central office 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 serviced by the central office 103 or in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a modem termination system (e.g., an MTS), which may be a computing device configured to manage communications between devices on the network of lines 101 and backend devices such as servers 105-107 (to be discussed further below). The MTS may be as specified in a standard, such as, in the example of an HFC network, the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include or be associated with one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and with other devices on the network 109 such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on TOMCAT/MYSQL, OSX, BSD, UBUNTU, REDHAT, HTML5, JAVASCRIPT, AJAX and COMET). For example, an application server 107 may be responsible for collecting television program listings information and generating a data download for electronic program guide listings. Another application server may be responsible for monitoring user viewing habits and collecting that information for use in selecting advertisements and/or making recommendations. Another application server may be responsible for formatting and inserting advertisements in a video stream being transmitted to the homes 102. Another application server may be responsible for receiving user remote control commands, and processing them to provide an intelligent remote control experience. An application server 107 can be programmed to determine and provide various content recommendation system features described herein.

An example home 102a may include an interface 120. The interface 120 may have a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device or a device such as a satellite receiver. The interface 120 may also have a gateway interface device 111. The modem 110 may be connected to, or be a part of, the gateway interface device 111. The gateway interface device 111 may be a computing device that communicates with the modem 110 to allow one or more other devices in the home to communicate with the central office 103 and other devices beyond the central office. The gateway 111 may be a standalone device, or may be implemented in a terminal, such as a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
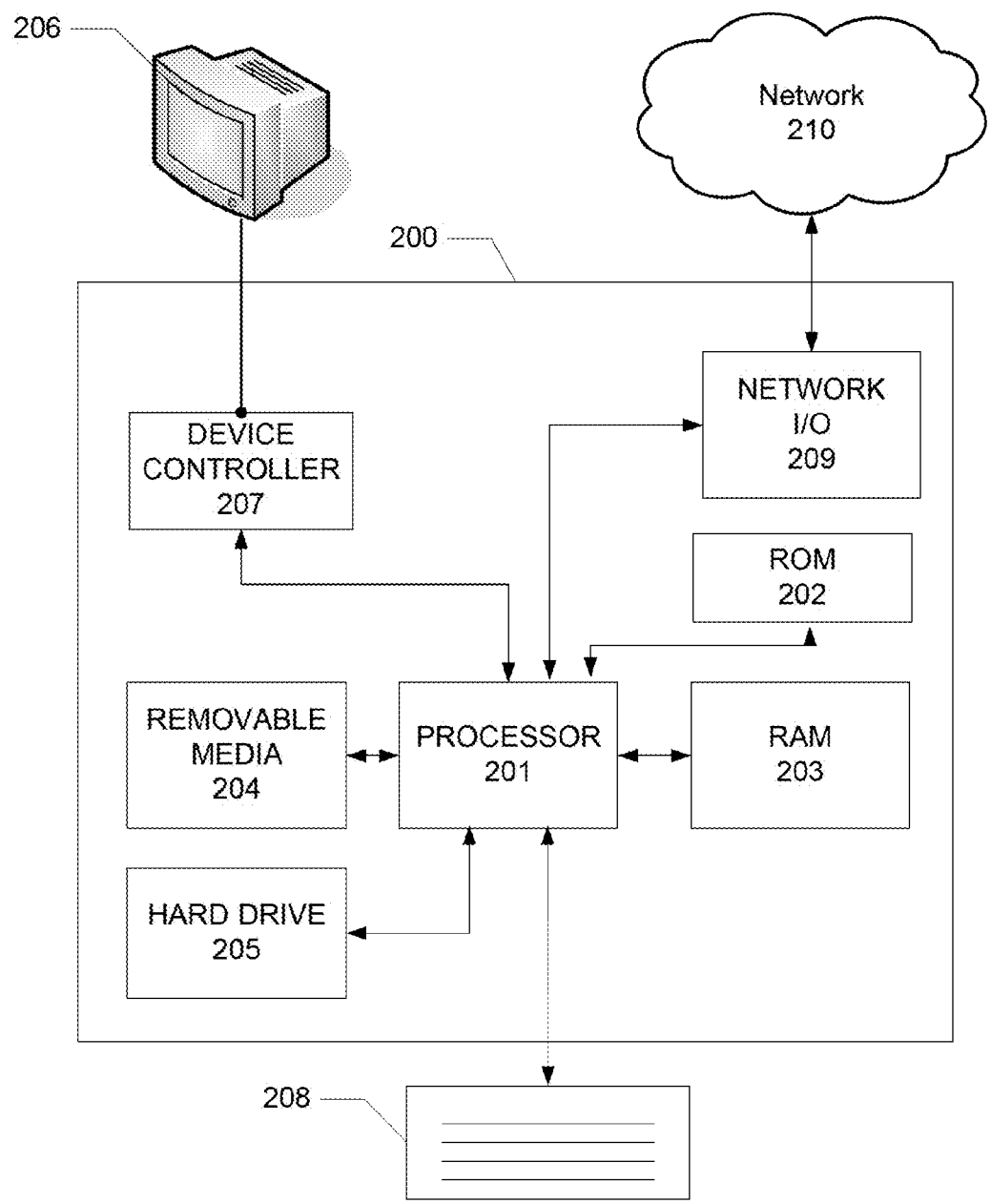
FIG. 2 illustrates an example computing device on which at least some of the various features described herein may be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The following description illustrates example methods of generating and providing item recommendations to one or more users. Users may include customers of a service provider, such as a video-on-demand (VOD) provider, and may be assigned customer IDs by the service provider. Alternatively, service providers may use preexisting user identifiers, such as a name, an email address, a social security number, etc. In some embodiments, users may be associated with one or more device identifiers (e.g., users that use one or more devices). Device identifiers may include unique characters that identify a particular device (e.g., serial number, model number, telephone number, workstation number, a phone number, a device name, etc.). For example, a user may be associated with a gateway 111 identifier, a STB 113 identifier, or any other device (e.g., devices 112, 114, 115, 116) identifier. In some instances, a single user may use a device, such that only the user is associated with the device. In other instances, multiple users may use the same device, such that all individuals associated with the device identifier may be grouped together as a single user. In other embodiments, users may be identified by one or more profiles. For example, a user may be identified by an account with a service provider, the account associated with a login username and/or password. Accounts may include, but are not limited to, online accounts, STB accounts, VOD accounts, etc. Users may correspond to individual terminals or homes. Alternatively, users may correspond to each individual such as each member of a household who has a unique user ID and their own profile.

Items may include, for example, video content (e.g., movies, TV shows, online movies or shows, etc.), audio content (e.g., music, book recordings, lecture recordings, etc.), audio-visual content and/or other data content. Additionally, a recommendation system may make recommendations for any item that may be associated with other items by a similarity indicator, as will be explained in detail in the examples below. Furthermore, each step may be performed by one or more computing device, such as computing device 200 implemented in one of the push notification server 105, content server 106, application server 107, or any other computing device at central office 103. Alternatively, the steps may be performed by one or more computing device located off-site from central office 103. For example, the steps may be performed at an off-site server and recommendations and/or results may be transmitted through network 109 to the central office 103. The central office 103 may then individually distribute recommendations to various users and/or homes 102. Additionally, the steps may be performed in a distributed computing environment. For example, multiple computing devices (e.g., computing devices 200) and/or nodes (e.g., computing device partitions, computing device clusters, etc.), interconnected by a computer network, may perform the following example methods of generating and providing item recommendations. For purposes of this description, the example methods of providing item recommendations will be described, as non-limiting examples, as being performed by an application server 107.

Figure 3:
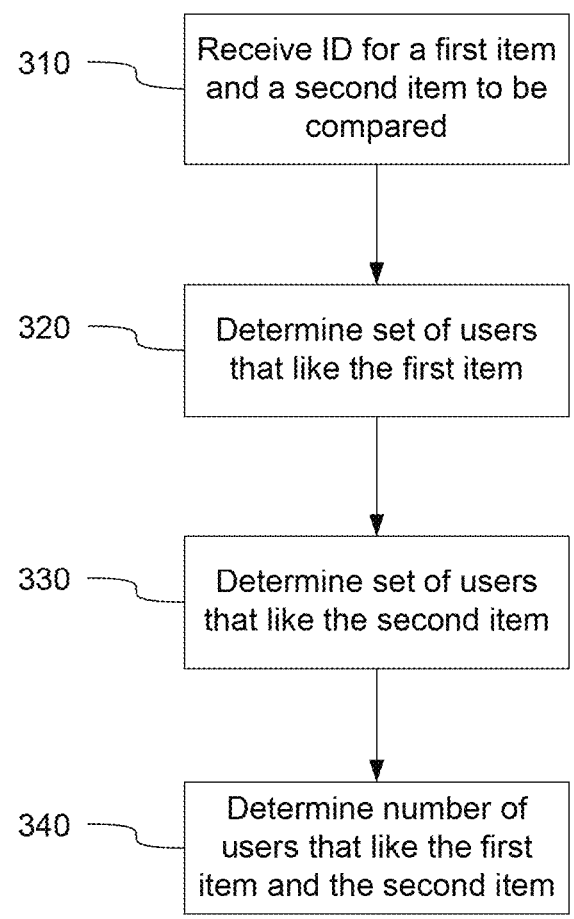
FIG. 3 illustrates an example method for determining the number of users that like one or more items according to one or more aspects described herein.

FIG. 3 illustrates an example method for determining the number of users that like one or more items (e.g., portions or entire pieces of content) according to one or more aspects described herein. In step 310, application server 107 may receive information identifying a first item and a second item to be compared (e.g., a unique identifier in metadata or elsewhere, such as an item name or item number). For example, a "first item" may be an item known to be "liked" (e.g., recorded, viewed, rated highly, otherwise acted upon, etc. as will be described in further detail in the examples below) by a particular user, and item similarity may be determined for a "second item," based on the first item. As will be described in more detail in the examples below, the item recommendation system may recommend a second item to a user if the user liked the first item, and the first and second items are similar (e.g., as determined by a similarity indicator). Another server and/or database may push item identifiers for a first and a second item to application server 107. Alternatively, application server 107 may receive identifiers for a first item and second item in response to a request. For example, a user or system administrator may request, by entering a command through an input device, for the recommendation system to determine whether to recommend one or more items. Similarity between multiple items may also be determined. In this case, more than two item identifiers may be received by application server 107. If item identifiers are received from another server and/or database, the identifiers may be received in one or more packets. For example, application server 107 may receive identifiers for a first item and a second item in a first data packet. After determining the similarity of a first item to a second item and/or vice versa, application server 107 may receive an identifier for a third item. Application server 107 may subsequently determine the similarity of a first item to a third item (and vice versa), and/or a second item to a third item (and vice versa). The process of receiving identifiers and computing similarity may be performed until similarity indicators among all items have been determined or until application server 107 stops receiving and/or requesting item identifiers.

In step 320, application server 107 may determine and store identifiers for a set of users (e.g., content provider customers) that like a first item. In some embodiments, application server 107 may additionally indicate that the first item is liked by one or more users (e.g., by setting a flag for the first item). The application server 107 may use one or more criteria to determine whether a user likes a particular item (e.g., a first item), such as a video program. In some embodiments, application server 107 may determine that a user that has wholly or partially recorded a video program likes the video program. In other embodiments, application server 107 may determine that a user that has viewed a previously recorded video program likes the video program. Application server 107 may also compare the amount or percentage of a video program consumed to a predetermined threshold to determine whether a user likes the video program. For example, application server 107 may log when a user starts consuming a video program, such as video-on-demand content, and when a user stops consuming the video program (e.g., based on a user stopping playback or the video program reaching its end). Application server 107 may calculate the length consumed and compare it to a total length of the video program. Based on the amount or percentage of the video program consumed, the application server 107 may determine whether a user likes the video program. For example, application server 107 may determine that a user likes a recorded content such as a movie or TV show if the user viewed approximately 80% or more of the movie or TV show. Application server 107 may also determine that a user dislikes a recorded movie or TV show if the user watched approximately less than 80% of the movie or TV show. Alternatively, multiple like/dislike thresholds may be used. For example, application server 107 may determine that a user likes a movie if the user watched approximately 80% of the movie, neither likes nor dislikes a movie if the user watched between approximately 33% and 80% of the movie, and dislikes a movie if the user watched less than approximately 33% of the movie. Any number of thresholds may be used. For example, a user may strongly like, like, be impartial, dislike, or strongly dislike a movie (e.g., where 5 thresholds are used). As will be described in further detail in the examples below, the recommendation system may apply a plurality of weights in determining item similarity and recommendations based on a user strongly liking, liking, etc. one or more items.

In some embodiments, application server 107 may determine that a user that views a real-time video program likes the video program. Similar to recorded video programs, application server 107 may compare the amount or percentage of a video program consumed to a predetermined threshold to determine whether a user likes the video program. In some instances, application server 107 may determine that a user views a real-time video program by determining that the user switched to the channel streaming the video program. For example, an electronic programming guide rendered or displayed on a terminal or television may detect when a user switches channels and transmit this detection to application server 107. In some embodiments, application server 107 may determine that the user likes the video program streaming in the channel that the user switches to. In other embodiments, application server 107 may determine that the user likes the video program streaming in the channel switched to if the user also remains on that channel for a predetermined amount of time (e.g., 10 minutes for a television show after switching to the television show). In further embodiments, application server 107 may determine that the user likes a video program streaming or to be streamed in the channel switched to if the user switched to the channel within a predetermined amount of time prior to or after the scheduled start time of the video program (e.g., within 5 minutes before or after the scheduled start time of a television show). Although single instances of consumption have been described with respect to recorded and real-time programs, application server 107 may take into account multiple instances of consumption to determine whether a user likes a video program. For example, application server 107 may determine that a user likes a video program (e.g., a movie) if the user viewed the video program at least two times.

In addition to or instead of using recording, consumption of a recorded program, consumption amount or percentage, etc., user likes or dislikes may be indicated by feedback received from the user. In some embodiments, a user may be prompted (e.g., by displaying an interactive message on the content consumption device) to provide feedback for an item after consuming the item. For example, a user may be requested to rate (e.g., using a 5-star rating scale), indicate like or dislike, provide a substantive review, etc. for one or more consumed items. For a substantive review, application server 107 may process the review and determine a like or dislike based on the language, tone, etc. provided in the review. For example, use of the word "boring" in the review might indicate a dislike, whereas use of the word "exciting" might indicate a like. In step 320, application server 107 may use the user feedback to determine whether the user liked the item. For example, in a 5-star rating system, three or more stars might indicate that the user liked the item, whereas one or two stars might indicate that the user disliked the item. If no user information is available (e.g., no consumption percentage, no feedback, etc.), application server 107 may determine, in step 320, that a user likes all items he or she consumed, either wholly or partially. In step 330, application server 107 may determine, in a manner similar to that previously described, and store identifiers for a set of users that like a second item. Alternatively or in addition to storing identifiers for one or more sets of users, application server 107 may store an indicator for the first item and an indicator for the second item. The indicators may indicate a set of users that like the first item and/or the second item. For example, an indicator for the first item may have one or more data fields storing identifiers for one or more users that like the first item. Similarly, an indicator for the second item may have one or more data fields storing identifiers for one or more users that like the second item.

In step 340, application server 107 may determine a total number of users that like both a first item and a second item. For example, application server 107 may determine the intersection of users and/or user identifiers that like a first item (e.g., as determined in step 320) and users and/or user identifiers that like a second item (e.g., as determined in step 330). Furthermore, if L(x) represents a set of users that like an item x, $L(x_1)$ may represent a set of users that like a first item, $x_1$, and $L(x_2)$ may represent a set of users that like a second item, $x_2$. Then, the number of users that like both a first item and a second item ($c(x_1, x_2)$) may be represented as:

$$c(x_1,x_2)=\|L(x_1)\cap L(x_2)\|$$

Figure 4:
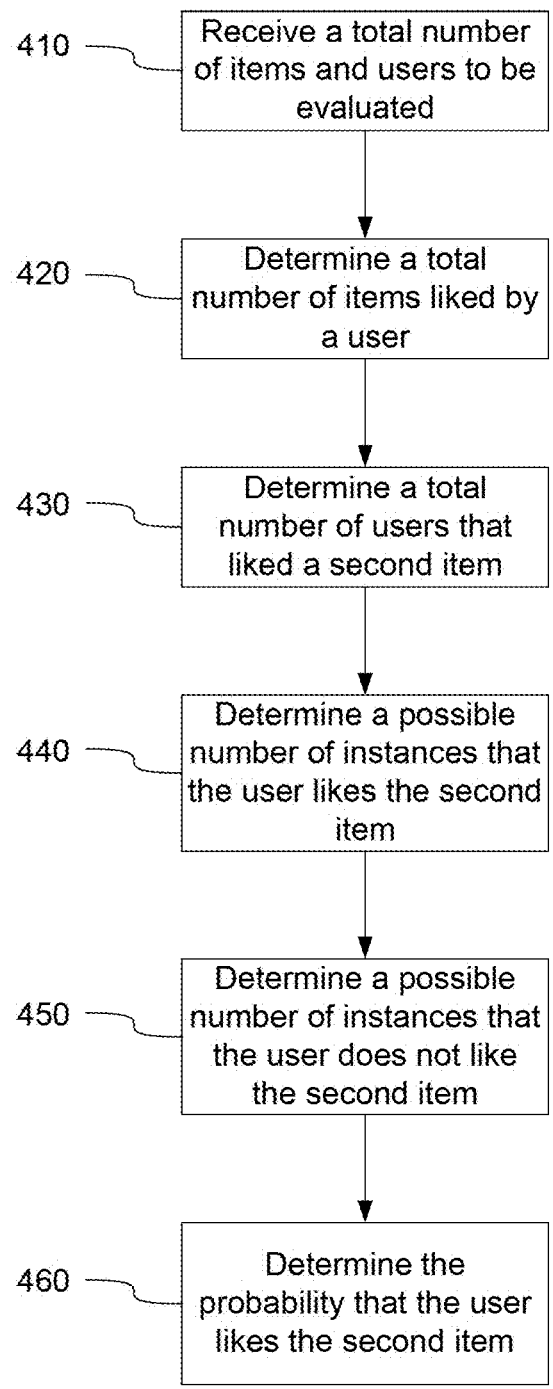
FIG. 4 illustrates an example method for determining the probability that a user likes one or more items according to one or more aspects described herein.

FIG. 4 illustrates an example method for determining the probability that a user likes one or more items according to one or more aspects described herein. In step 410, application server 107 may receive information on a total number of items (i.e., "I") and a total number of users (i.e., "U"). In step 420, application server 107 may receive or determine the total number of items liked by a user, for example, by evaluating item recording, consumption percentage, user ratings, etc., as previously described. The total number of items liked by a user, u, may be represented as:

$$\|L(u)\|$$

In step 430, application server 107 may determine the total number of users that like a second item, wherein the application server 107 may subsequently determine the similarity of the second item to a first item. The number of users that like a second item may similarly be determined by evaluating item recording, consumption percentage, user ratings, etc., for each user of the second item. The total number of users that like a second item, $x_2$, may be represented as:

$$\|L(x_2)\|$$

Instead of determining the set of users that like a second item ($L(x_2)$) and calculating the total number, application server 107 may retrieve $L(x_2)$ from a database if it was previously determined in, for example, step 330.

Figures 8A, 8B, 8C:
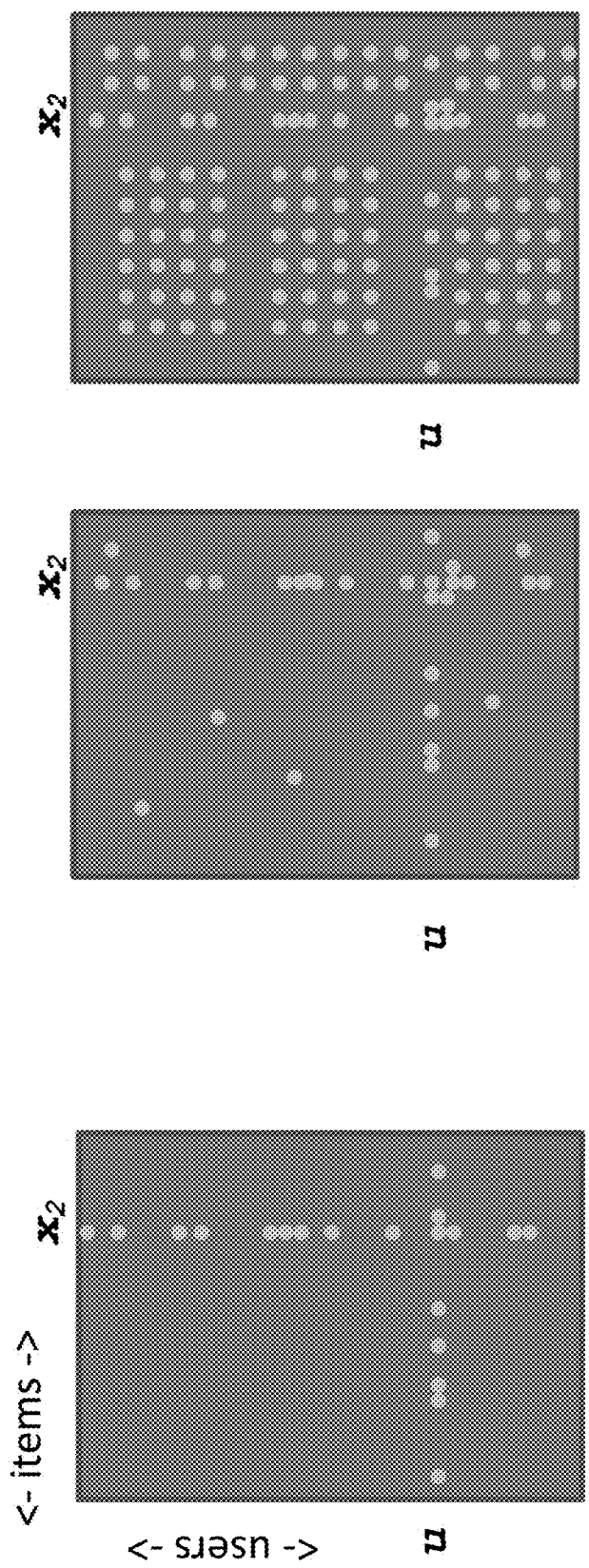
FIG. 8A illustrates an example matrix of users and items according to one or more aspects described herein.
FIG. 8B illustrates another example matrix of users and items according to one or more aspects described herein.
FIG. 8C illustrates an additional example matrix of users and items according to one or more aspects described herein.

FIG. 8A illustrates an example matrix of users and items according to one or more aspects described herein. Each column may represent an item (e.g., including item $x_2$), such that the matrix may include "I" columns if a total number of items to be evaluated is represented by I. Each row may represent a user (e.g., including user u), such that the matrix may include "U" rows if a total number of users to be evaluated is represented by U. Each dot in the example matrix of FIG. 8A may represent a "like" event. For example, a dot at ($x_2$,u) may indicate that user u likes an item $x_2$. Furthermore, each dot may represent an actual like or a hypothetical like (e.g., a possible like). For example, a dot at ($x_2$,u) might represent that a user u likes item $x_2$, such as when it is known that the user actually likes the item. Alternatively, a dot at ($x_2$,u) might represent one possible instance where a user u likes item $x_2$, such as when the user has not yet consumed item $x_2$ and it is to be determined whether to recommend the item to the user. "Dislike" events may similarly be represented in the item-user matrix, such as empty spaces, different colored dots, different symbols, etc.

Returning to FIG. 4, in step 440, application server 107 may determine the possible number of instances that a user u might like an item $x_2$ (i.e., "positive cases" P). For example, in FIG. 8A, a dot at ($x_2$,u) may indicate an instance that user u likes item $x_2$. The number of positive cases for a user u and item $x_2$ may be determined by summing each possible instance that a dot appears at ($x_2$,u) in an item-user matrix. Alternatively, a subset of each possible instance may be summed. For example, summing of instances may exclude one or more items and/or users, such as when data for one or more items and/or users is unreliable (e.g., data unreadable, mistaken like, etc.). Therefore, application server 107 may determine the number of positive cases by fixing a dot at ($x_2$,u) in an item-user matrix (e.g., by making point ($x_2$,u) unavailable to dislikes, impartials, etc.) and determining the number of possibilities for the remaining positions in the item-user matrix. Remaining dots, indicating a like, may be assumed to take on a probability distribution, such as a random distribution. For example, if the remaining dots are spread randomly, permutations of those dots may be equiprobable. Furthermore, a random distribution of dots may represent users randomly liking or disliking one or more items. Accordingly, fixing a dot at ($x_2$,u), the number of possibilities for the remaining dots to fill a particular row (e.g., row u) may be the number of combinations of the remaining dots to fill up the available spots in the particular row. Furthermore, the number of remaining dots for a row u may be represented as:

$$\|L(u)\|-1$$

In particular, assuming, for positive cases, that a single dot is reserved for position ($x_2$,u), the number of remaining dots might be the total number of items that user u likes (e.g., $\|L(u)\|$) minus a single dot (e.g., reserved for position ($x_2$,u)). The available spots for dots in row u may be represented as:

$$I-1$$

In particular, assuming that a single dot is reserved for position ($x_2$,u), the number of available positions for dots might be the total number of items (e.g., I) minus a single position (e.g., reserved for dot at position ($x_2$,u)). The number of combinations of the remaining dots to fill up the available spots in a row u may then be represented as a combination:

$$\binom{I-1}{\|L(u)\|-1}$$

Similarly, still assuming a random distribution of dots, the number of possible positions for remaining dots (with a dot fixed at ($x_2$,u)) in a column $x_2$ may be the number of combinations of the remaining dots to fill up the available spots in a particular column. For example, the number of remaining dots for a particular column $x_2$ may be represented as:

$$\|L(x_2)\|-1$$

In particular, assuming, for positive cases, that a single dot is reserved for position ($x_2$,u), the number of remaining dots might be the total number of users that like an item $x_2$ (e.g., $\|L(x_2)\|$) minus a single dot (e.g., reserved for position ($x_2$,u)). The available spots for dots in a column $x_2$ may be represented as:

$$U-1$$

In particular, assuming that a single dot is reserved for position ($x_2$,u), the number of available positions for dots might be the total number of users (e.g., U) minus a single position (e.g., reserved for dot at position ($x_2$,u)). The number of combinations of the remaining dots to fill up the available spots in a column $x_2$ may then be represented as a combination:

$$\binom{U-1}{\|L(x_2)\|-1}$$

As previously described, a number of positive cases for a user u and an item $x_2$ may include the total number of instances that a dot appears at ($x_2$,u) in an item-user matrix. A number of positive cases may include possible combinations of the combinations of dots in a row u and combinations of dots in a column $x_2$. For example, the number of positive cases (#P) may be represented as:

$$\#P = \binom{I-1}{\|L(u)\|-1} \cdot \binom{U-1}{\|L(x_2)\|-1}$$

Namely, the number of positive cases may be represented as the number of combinations of $\|L(u)\|-1$ horizontal points among I-1 positions multiplied by the number of combinations of $\|L(x_2)\|-1$ vertical points among U-1 positions.

In step 450, application server 107 may similarly determine the possible number of instances that a user u might not like an item $x_2$ (i.e., "negative cases" N). For example, in FIG. 8A, an empty spot at position $(x_2,u)$ may indicate an instance that user u does not like item $x_2$. The number of negative cases for a user u and item $x_2$ may be determined by summing each possible instance that a dot does not appear at $(x_2,u)$ in an item-user matrix. Alternatively, a subset of each possible instance may be summed. For example, summing of instances may exclude one or more items and/or users, such as when data for one or more items and/or users is unreliable (e.g., data unreadable, mistaken dislike, etc.). Therefore, application server 107 may determine the number of negative cases by fixing an empty space at $(x_2,u)$ in an item-user matrix (e.g., by making point $(x_2,u)$ unavailable to likes) and determining the number of possibilities for the remaining positions in the item-user matrix. Assuming that dots may be randomly distributed in an item-user matrix, all permutations of dots may be equiprobable. Therefore, fixing position $(x_2,u)$ as an empty position, the number of possibilities for dots to fill a row u may be the number of combinations of the dots to fill up the available spots in row u. Furthermore, the number of dots for a row u may be represented as:

$$\|L(u)\|$$

In particular, assuming, for negative cases, that an empty space is reserved for position $(x_2,u)$, the number of remaining dots might be the total number of items liked by user u (e.g., $\|L(u)\|$). The available spots for dots in row u may be represented as:

$$I-1$$

In particular, assuming that an empty space is reserved for position $(x_2,u)$, the number of available positions for dots might be the total number of items (e.g., I) minus a single position (e.g., reserved for an empty space at position $(x_2,u)$). The number of combinations of the remaining dots to fill up the available spots in row u may then be represented as a combination:

$$\binom{I-1}{\|L(u)\|}$$

Similarly, still assuming a random distribution of dots, the number of possible positions for dots (with an empty space fixed at $(x_2,u)$ in a column $x_2$ may be the number of combinations of the dots to fill up the available spots in a particular column. For example, the number of dots for a particular column $x_2$ may be represented as:

$$\|L(x_2)\|$$

In particular, assuming, for negative cases, that an empty space is reserved for position $(x_2,u)$, the number of remaining dots might be the total number of users that like item $x_2$ (e.g., $\|L(x_2)\|$). The available spots for dots in a particular column $x_2$ may be represented as:

$$U-1$$

In particular, assuming that an empty space is reserved for position $(x_2,u)$, the number of available positions for dots might be the total number of users (e.g., U) minus a single position (e.g., reserved for an empty space at position $(x_2,u)$). The number of combinations of the remaining dots to fill up the available spots in a column $x_2$ may be represented as a combination:

$$\binom{U-1}{\|L(x_2)\|}$$

As previously discussed, a number of negative cases for a user u and an item $x_2$ may include the total number of instances that an empty space appears at $(x_2,u)$ in an item-user matrix. A number of negative cases may include possible combinations of the combinations of dots in a row u and combinations of dots in a column $x_2$. For example, the number of negative cases (#N) may be represented as:

$$\#N = \binom{I-1}{\|L(u)\|} \cdot \binom{U-1}{\|L(x_2)\|}$$

Namely, the number of negative cases may be represented as the number of combinations of $\|L(u)\|$ horizontal dots among I−1 positions multiplied by the number of combinations of $\|L(x_2)\|$ vertical dots among U−1 positions.

In step 460, application server 107 may determine the probability that a user (e.g., user u) will like an item (e.g., second item $x_2$). For example, assuming a random distribution of "like" events, application server 107 may determine the probability by dividing the number of combinations for which user u might like item $x_2$ by a total number of combinations for a particular row and column. As previously described, the number of combinations for which a user u might like item $x_2$ may be represented by the number of positive cases. The total number of combinations may be represented by the sum of the positive cases and the negative cases. Therefore, the probability that user u will like item $x_2$ may be represented as:

$$p(u, x_2) = \frac{\#P}{\#P + \#N}$$

$$= \frac{\binom{I-1}{\|L(u)\|-1} \cdot \binom{U-1}{\|L(x_2)\|-1}}{\binom{I-1}{\|L(u)\|-1} \cdot \binom{U-1}{\|L(x_2)\|-1} + \binom{I-1}{\|L(u)\|} \cdot \binom{U-1}{\|L(x_2)\|}}$$

The probability that a user u will like an item $x_2$ may further simplify to:

$$p(u, x_2) = \frac{1}{1 + \frac{I - \|L(u)\|}{\|L(u)\|} \cdot \frac{U - \|L(x_2)\|}{\|L(x_2)\|}}$$

Figure 5:
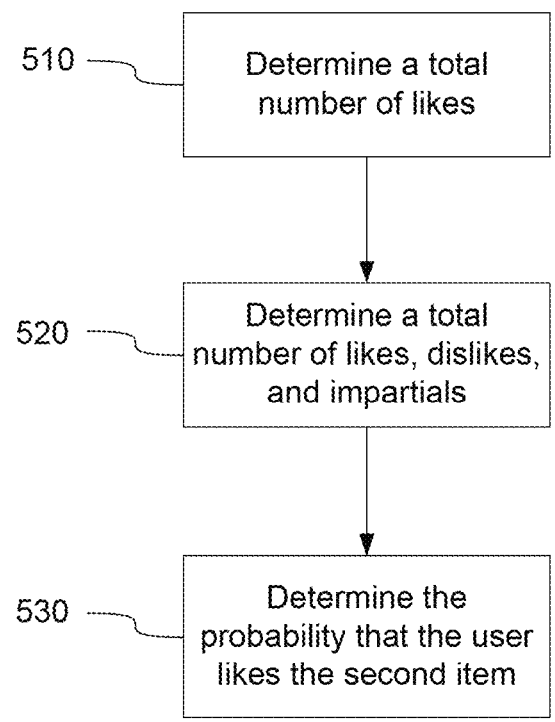
FIG. 5 illustrates another example method for determining the probability that a user likes one or more items according to one or more aspects described herein.

FIG. 5 illustrates another example method for determining the probability that a user likes one or more items according to one or more aspects described herein. In particular, the steps shown in FIG. 5 illustrate an example method for factoring the environment into determining the probability that a user likes one or more items. Environmental factors may include, for example, a number and/or density of likes (e.g., the number and/or density of dots in an item-user matrix). Application server 107, when factoring in the environment, may use the expression for probability previously described with respect to FIG. 4:

$$p(u, x_2) = \frac{1}{1 + \frac{I - \|L(u)\|}{\|L(u)\|} \cdot \frac{U - \|L(x_2)\|}{\|L(x_2)\|}}$$

FIG. 8B illustrates an example matrix of users and items according to one or more aspects described herein. In particular, FIG. 8B illustrates an example of a low density of likes relative to the number of likes along row u and column $x_2$. Because of the low density of likes (e.g., fewer possible locations for a "like" event), FIG. 8B illustrates an example situation where the point $(x_2,u)$ might more likely include a dot (e.g., a like instance). For example, if $x_2$ represents a movie item, there is a higher chance that users u will like movie $x_2$ than any other movie x.

FIG. 8C illustrates an example matrix of users and items according to one or more aspects described herein. In particular, FIG. 8C illustrates an example of a high density of likes relative to the number of likes along row u and column $x_2$. Because of the high density of likes (e.g., more possible locations for a "like" event), FIG. 8C illustrates an example situation where the point $(x_2,u)$ might be less likely to include a dot (e.g., a like instance).

Accordingly, the probability that a user u will like an item $x_2$ is greater in the example matrix of 8B than in the example matrix of 8C because there are fewer possible positions for a like event in the matrix of 8B than the matrix of 8C. An environmental effect may be factored into a probability as a normalization factor, $\epsilon$, and the probability that user u will like item $x_2$ may be represented as:

$$p(u, x_2) = \frac{1}{1 + \varepsilon \cdot \frac{I - \|L(u)\|}{\|L(u)\|} \cdot \frac{U - \|L(x_2)\|}{\|L(x_2)\|}}$$

Returning to FIG. 5, in step 510, application server 107 may determine a total number of likes. A total number of likes may include, for example, a total number of likes of all users (e.g., a set of users U) for all items (e.g., a set of items I). Alternatively, the total number of likes may include a total number of likes for a subset of users and/or items. For example, a total number of likes may include all likes in a particular item-user matrix (e.g., all dots). Alternatively, a total number of likes may include all likes except for likes by a user u and/or all likes of item $x_2$. A total number of likes may be represented by V.

In step 520, application server 107 may determine a total number of likes, dislikes, and/or impartials. In particular, application server 107 may determine the total number of available positions in an item-user matrix. A total number of available positions may be represented by I·U, where I may represent the total number of items to be evaluated and U may represent the total number of users to be evaluated.

In step 530, application server 107 may determine the probability that user u will like item $x_2$, factoring in the effect of like density. In particular, the probability that a user u will like an item $x_2$ may be represented as the average density of likes as:

$$p(u, x_2) = \frac{V}{U \cdot I}$$

This may be the case if user u has an average number of likes out of all users. Then, $\|L(u)\|$ may be represented as:

$$\|L(u)\| = \frac{V}{U}$$

Similarly, item $x_2$ may have an average number of likes out of all items. Then, $\|L(x_2)\|$ may be represented as:

$$\|L(x_2)\| = \frac{V}{I}$$

Therefore, an environmental effect may be factored into a probability by resolving the following expression:

$$p(u, x_2) = \frac{V}{U \cdot I}$$
$$= \frac{1}{1 + \varepsilon \cdot \frac{I - \|L(u)\|}{\|L(u)\|} \cdot \frac{U - \|L(x_2)\|}{\|L(x_2)\|}}$$

An effect, $\epsilon$, of a density of likes on a probability that a user likes a particular item may be represented as:

$$\varepsilon = \frac{V}{U \cdot I - V}$$

Therefore, in step 530, application server 107 may determine the probability that a user u will like a second item $x_2$ by determining:

$$p(u, x_2) = \frac{1}{1 + \frac{V}{U \cdot I - V} \cdot \frac{I - \|L(u)\|}{\|L(u)\|} \cdot \frac{U - \|L(x_2)\|}{\|L(x_2)\|}}$$

Figure 6:
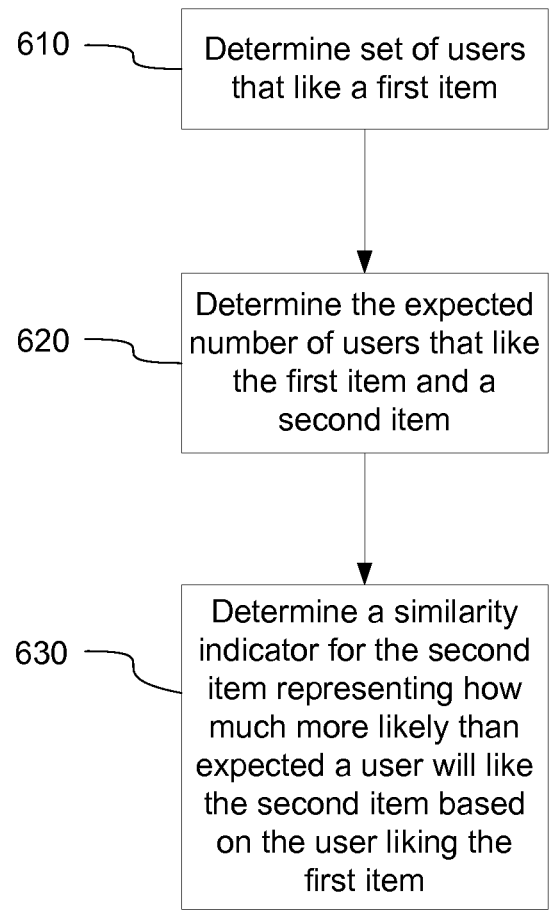
FIG. 6 illustrates an example method for determining the similarity between one or more items according to one or more aspects described herein.

FIG. 6 illustrates an example method for determining the similarity between one or more items according to one or more aspects described herein. Similarity of a second item to a first item may be represented as how much more than randomly expected is a user to like a second item if the user liked a first item. For example, the similarity of a second item to a first item may be the ratio of the actual number of users that like a first item and a second item (e.g., $c(x_2,x_1)$) to the expected number of users that like a first item and a second item (e.g., $e(x_2,x_1)$). In particular, the similarity of a second item, $x_2$, to a first item, $x_1$, may be represented as:

$$sim(x_2, x_1) = \frac{c(x_2, x_1)}{e(x_2, x_1)}$$

In step 610, application server 107 may determine and store identifiers for a set of users (e.g., customers of a content provider) that like a first item, $x_1$. Application server 107 may determine the set in a manner similar to step 320. In step 620, application server 107 may determine the expected number of users that like a first item and a second item (e.g., $e(x_2,x_1)$). In some embodiments, the expected number of users that like a first item and a second item may be an accumulated probability that a set of users will like the second item. In further embodiments, application server 107 may consider a set of users that are known to like a first item $x_1$ to determine the expected number of users that like the first item and the second item. For example, application server 107 may determine the expected number by determining, for each user that likes an item $x_1$, the probability that each user likes a second item $x_2$ and summing the probabilities. For example, the expected number of users that like a first item and a second item may be represented as:

$$e(x_2,x_1)=\Sigma_{u\in L(x_1)}p(u,x_2)$$

In step 630, application server 107 may determine the similarity between a first item and a second item. Application server 107 may have previously determined the actual number of users that like a first item and a second item (e.g., in step 340). For example, the actual number of users that like a first and second item may be represented as:

$$c(x_2,x_1)=\|L(x_1)\cap L(x_2)\|$$

Furthermore, application server 107 may determine the similarity between a first item $x_1$ and a second item $x_2$ according to the following expression:

$$sim(x_2, x_1) = \frac{\|L(x_1) \cap L(x_2)\|}{\sum_{u \in L(x_1)} p(u, x_2)}$$

Accordingly, the similarity of an item $x_2$ to an item $x_1$ may represent how much more than randomly expected a user will like item $x_2$, given that the user likes item $x_1$. In some embodiments, the larger the ratio of users that actually like $x_1$ and $x_2$ to users that are expected to like $x_1$ and $x_2$, the greater the similarity. For example, a similarity indicator much greater than 1 may indicate that $x_1$ and $x_2$ are very similar. A similarity indicator much smaller than 1, on the other hand, may mean that far more users were expected to like $x_1$ and $x_2$ than actually occurred. In such a case, application server 107 may determine that $x_1$ and $x_2$ are dissimilar. If the actual number of users that like an item $x_1$ and an item $x_2$ is approximately equal to the expected number of users that like an item $x_1$ and an item $x_2$, the similarity indicator $sim(x_2, x_1)$ may be approximately equal to 1. In such a case, application server 107 may determine that items $x_1$ and $x_2$ are neither similar nor dissimilar. In some embodiments, the more similar a second item $x_2$ is to a first item $x_1$, the more likely the second item will be recommended to one or more users if it is known that the one or more users like the first item. For example, if it is known that a user likes $x_1$ (e.g., indicated by recording, consumption percentage, item rating, etc.), application server 107 may recommend $x_2$ to the user if the similarity between $x_2$ and $x_1$ exceeds a predetermined threshold. In some embodiments, the predetermined threshold may be 1, such that when a user is one time more likely to like an item $x_2$ than is randomly expected, application server 107 may recommend item $x_2$ to the user. In other embodiments, the predetermined threshold may include a safeguard offset in order to exclude items that are only slightly similar (e.g., a similarity indicator of approximately 1). In such embodiments, the safeguard offset may be 0.2, and the predetermined threshold may be 1.2, for example. In further embodiments, the predetermined threshold may depend on how restricted a first item $x_1$ is. The level of restriction may be based on item metadata, such as genre. For example, if the first item can be categorized under many genres (e.g., four genres such as love, war, friendship, and mother-daughter relationships), the predetermined threshold may be 1 or relatively close to 1 because there may be a limited list/number of items that share exactly the same genres as the first item. On the other hand, if the first item can be categorized under a limited number of genres (e.g., one genre such as horror), the predetermined threshold may be greater than 1 (e.g., 3) because many items may share the same genre as the first item.

The similarity indicator previously described has the characteristic of being asymmetrical. In particular, the similarity indicator of an item $x_2$ to an item $x_1$ might not be the same as the similarity indicator of an item $x_1$ to an item $x_2$. For example, application server 107 may determine that a user may be X (e.g., three) times more likely than expected to like item $x_2$, given that the user likes item $x_1$. Application server 107 may also determine that the user is less than X (e.g., two) times more likely than expected to like an item $x_1$, given that the user likes item $x_2$. This characteristic gives the recommendation system the additional benefit of accurately recommending items to users, such as when the items partially overlap in one or more features (e.g., metadata characteristics). For example, if the genre of a movie $x_1$ is romance, and the genres of a movie $x_2$ are romance and war, a user that likes $x_1$ (e.g., a romance movie) might largely be expected to like $x_2$ (e.g., a romance and war movie) because $x_2$ includes romance features. On the other hand, a user that likes $x_2$ may not be as largely expected to like $x_1$ because the user may like $x_2$ for its war feature, but not necessarily for its romance feature.

Figure 7:
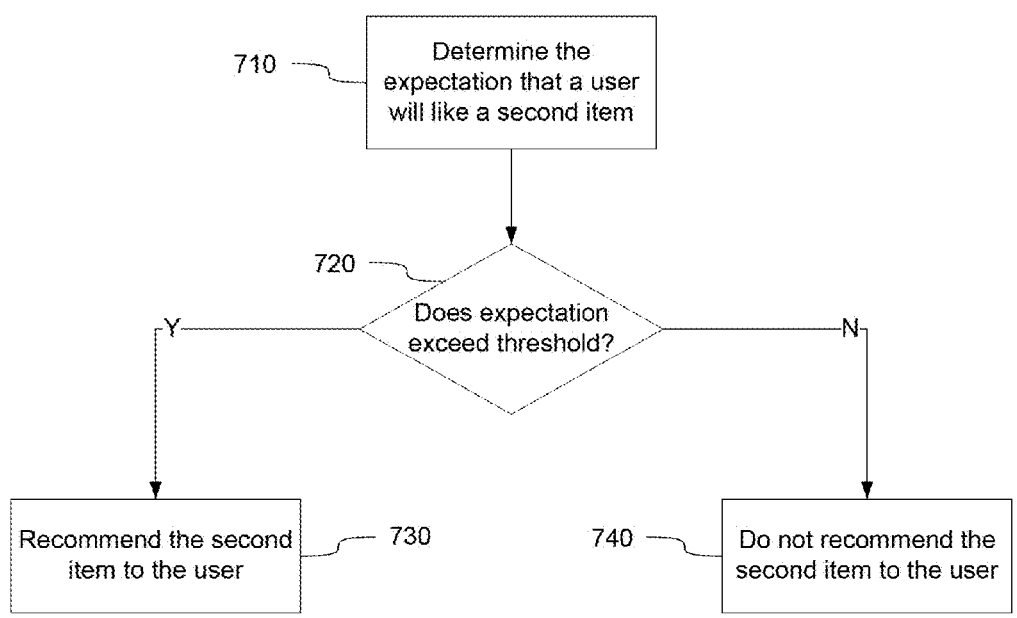
FIG. 7 illustrates an example method for making a personalized recommendation to a user according to one or more aspects described herein.

FIG. 7 illustrates an example method for making a personalized recommendation to a user according to one or more aspects described herein. In step 710, application server 107 may determine the expectation that a user will like an item $x_2$. In some embodiments, the expectation may be based on the probability that the user will like an item $x_2$ based on a random hypothesis. In these embodiments, the expectation that a user u will like an item $x_2$ may be represented as:

$$l(u,x_2)=p(u,x_2)$$

In another embodiment, the expectation that a user will like an item $x_2$ may additionally be based on the similarity between an item $x_1$ and an item $x_2$, where it is known that the user likes item $x_1$. This expectation may be represented as:

$$l(u,x_2)=p(u,x_2)\cdot sim(x_2,x_1)$$

In other embodiments, the expectation that a user will like an item $x_2$ may be based on an accumulation of similarity evidence. For example, the similarity of an item $x_2$ to another item may be determined for all items or a subset of items known to be liked by the user u (e.g., L(u)), which may be represented as $\Sigma_{x_2\in L(u)}sim(x_2, x_1)$. Furthermore, because the similarity represents the ratio of the actual number of users that like a first and second item to the number of users expected to like a first and a second item, a similarity of approximately 1 may indicate that a second item is unrelated to a first item. As such, an offset of 1 may be included in an expression of the accumulated similarity of a particular item to other items known to be liked by user u, which may be represented as $\Sigma_{x_2\in L(u)}sim(x_2, x_1)-1$, such that an item being unrelated to another item (e.g., similarity indicator≈1) will have a minor effect on the accumulated similarity. Furthermore, in order to accommodate for the introduced offset of 1, an additional offset of 1 may be introduced. For example, an expression of the accumulated similarity of an item $x_2$ to other items known to be like by user u may be represented as $1+\Sigma_{x_2\in L(u)}sim(x_2, x_1)-1$. Furthermore, only the similar items may be factored into the accumulated similarity (e.g., dissimilar or neutral items excluded from accumulated similarity). For example, evidence of item similarity may be factored into the accumulated similarity when the similarity is greater than a predetermined threshold. For example, the predetermined threshold may be 1 (indicating that the actual number of users that like a first and second item is greater than or equal to the expected number). In other examples, the predetermined threshold may be slightly greater than 1, such as 1.1. Other thresholds may be used. For example, where a greater confidence in item similarity is preferred, a larger predetermined threshold, such as 3, may be used. Taking the example of a predetermined threshold of 1, an expression of the accumulated similarity of item $x_2$ to other items known to be liked by user u may be represented as $1+\Sigma_{x_2 \in L(u) | sim(x_2,x_1) > 1}(sim(x_2, x_1)-1)$.

By accumulating similarity for items known to be liked by a user, application server 107 may determine the expectation that the user will like an item $x_2$ by resolving the following:

$$l(u,x_2)=p(u,x_2) \cdot (1+\Sigma_{x_1 \in L(u) | sim(x_2,x_1) > 1}(sim(x_2,x_1)-1))$$

In some embodiments, accumulating similarity may factor in a user's dislikes. For example, application server may consider a like factor r in determining expectation. Like factor r may take on different values, depending on whether a user likes, dislikes, or is impartial toward an item (e.g., based on percentage consumption of an item, item rating, etc.). In an item rating system, for example, r may depend on the rating of an item given by a user. For example, the following conditions may be used in a five-star rating system (e.g., one star being the least liked and five stars being the most liked):

$$\begin{cases} r(u, x_1) = 0 & \text{if no rating is available} \\ r(u, x_1) = \frac{rating(u, x_1) - 2.5}{2.5} & \text{otherwise} \end{cases}$$

Therefore, like factor r may equal 1 if the user gave 5 stars and equal −0.6 if the user gave 1 star. As such, like factor r takes into consideration likes and dislikes by adding to the summation for items liked by the user (e.g., greater than 2.5 stars) and subtracting from the summation for items disliked by the user (e.g., less than 2.5 stars). Alternatively, like factor r may take on any number of predetermined values. The predetermined values may be preset by, for example, the content provider. For example, the following values may be used for like factor r:

$$\begin{cases} r(u, x_1) = 1 & \text{for a like} \\ r(u, x_1) = -0.3 & \text{for a dislike} \\ r(u, x_1) = -0.1 & \text{otherwise} \end{cases}$$

Predetermined values may similarly be set by a system administrator through an input device connected to the recommendation system. Factoring in likes, dislikes, and impartials, the expectation that a user will like an item $x_2$ may be represented as:

$$l(u,x_2)=p(u,x_2) \cdot (1+\Sigma_{x_1 | sim(x_2,x_1) > 1} r(u,x_1)(sim(x_2,x_1)-1))$$

In particular, the evidence may be accumulated for all items consumed by a user u (not just for items that user u likes) because like factor r takes into consideration whether the user likes or dislikes the item.

In step 720, application server 107 may determine whether an expectation, $l(u, x_2)$, exceeds a predetermined threshold. If so (step 720: Yes), application server 107, in step 730, may recommend item $x_2$ to the user. If not (step 720: No), application server 107, in step 740, might not recommend item $x_2$ to the user. Alternatively, application server 107 may determine the expectation l(u, x) for all items or a subset of items, rank the items based on the expectation value, and recommend a predetermined number of items to the user based on the ranking (e.g., the one hundred items with the largest expectations). Application server 107 may consider other factors for making item recommendations for users. For example, application server 107 may consider limitations of available data communication resources, such as bandwidth limitations.

Application server 107 may also consider user preferences in determining whether to transmit recommendations to one or more users, and if so, a number of recommendations to transmit. For example, if a user has specified the number of recommendations, application server 107 may transmit top recommendations (e.g., items with the highest similarity or expectation value) up to the specified number. Other factors or preferences that may be considered include, but are not limited to, whether the item includes adult content, the time of day or day of the week to transmit the recommendations, and service provider promotions. Additionally, application server 107 may consider metadata-based factors (e.g., genre, actors, directors, writers, settings, rating, popularity, video length, etc.). For example, if a user has specified a favorite genre, application server 107 may factor in genre, in addition to item similarity and/or expectation value, in making a recommendation. Content server may determine the similarity and/or expectation value, as previously described, and apply a predetermined weight to the similarity and/or expectation value for each item. Furthermore, application server 107 may rank evaluated items based on similarity/expectation value, as previously described. Application server 107 may additionally apply the same or a different weight to one or more other factors (e.g., genre, actors, etc.). For example, application server 107 might give similarity a 50% weight, genre a 30% weight, and public rating of the content a 20% weight for each item. Based on these weights, application server 107 may re-rank items based on a cumulative score and transmit recommendations to a user or groups of users based on the cumulative score. Application server 107 may provide recommendations in a number of ways. For example, recommendations may be provided to a user's gateway 111 and/or consumption devices, such as televisions 112, STBs 113, personal computers 114, laptop computers 115, and/or wireless devices 116. Furthermore, a user interface displaying recommendations may be provided at one or more consumption devices.

Although example embodiments are described above, the various features and steps may be combined, divided, omitted, and/or augmented in any desired manner, and other steps may be added, depending on the specific recommendation process desired. The scope of this patent should only be defined by the claims that follow.

We claim:

1. A method comprising:
    determining, by a computing device, an expected number of users, from a plurality of users that like a first item, that will also like a second item based at least in part on a summation of respective probabilities of liking the second item for each of the plurality of users that like the first item; and
    determining, for a particular user, a similarity indicator representing how much more likely the particular user is to like the second item based on liking the first item, the similarity indicator determined as a ratio of a number of users that previously indicated liking both the first item and the second item to the expected number of users.

2. The method of claim 1, further comprising:
determining that the similarity indicator is greater than a predetermined threshold; and
in response to determining that the similarity indicator is greater than the predetermined threshold, transmitting a recommendation for the second item to the particular user.

3. The method of claim 1, further comprising:
receiving an identifier for the first item liked by the particular user, the first item comprising video content;
determining a percentage of the video content played for the particular user; and
determining that the percentage of the video content played is greater than a predetermined threshold;
wherein the particular user liking the first item is in response to determining that the percentage of the video content played is greater than the predetermined threshold.

4. The method of claim 1, wherein the expected number of users (e) is determined as:

$$e(x_2, x_1) = \sum_{u \in L(x_1)} p(u, x_2)$$

wherein, $x_1$ represents the first item, $x_2$ represents the second item, $L(x_1)$ represents the plurality of users that like the first item, u represents any one user of the plurality of users, and $p(u,x_2)$ represents a probability that a respective user of the plurality of users will like the second item.

5. The method of claim 4, wherein determining the expected number of users (e) comprises determining the probability (p) that a user (u) will like the second item ($x_2$) according to:

$$p(u, x_2) = \frac{1}{1 + \frac{I - \|L(u)\|}{\|L(u)\|} \cdot \frac{U - \|L(x_2)\|}{\|L(x_2)\|}},$$

wherein I represents a total number of items to be considered, L(u) represents a set of items liked by the respective user, U represents a total number of users to be considered, and $L(x_2)$ represents a set of users that like the second item.

6. The method of claim 4, wherein determining the expected number of users (e) comprises determining the probability (p) that a user (u) will like the second item ($x_2$) according to:

$$p(u, x_2) = \frac{1}{1 + \varepsilon \cdot \frac{I - \|L(u)\|}{\|L(u)\|} \cdot \frac{U - \|L(x_2)\|}{\|L(x_2)\|}},$$

wherein $\varepsilon$ represents an environmental effect on the probability (p), I represents a total number of items to be considered, L(u) represents a set of items liked by the respective user, U represents a total number of users to be considered, and $L(x_2)$ represents a set of users that like the second item.

7. The method of claim 6, wherein determining the probability (p) comprises determining a value of $\varepsilon$ according to:

$$\varepsilon = \frac{V}{U * I - V},$$

wherein V represents a total number of likes of the items to be considered by any of the users to be considered.

8. The method of claim 1, further comprising:
determining the respective probabilities of liking the second item for each of the plurality of users that like the first item based at least on a total number of items to be considered, a number of items liked by a respective user, a number of times the second item has been liked, and a total number of users to be considered.

9. The method of claim 8, further comprising:
determining a normalization factor based at least on a total number of likes of the items to be considered by any of the users to be considered,
wherein determining the respective probabilities of liking the second item for each of the plurality of users that like the first item is further based on the normalization factor.

10. The method of claim 1, further comprising:
receiving an identifier for a third item liked by the particular user;
determining, for the particular user, a second similarity indicator representing how much more likely the particular user is to like the second item based on liking the third item; and
determining an accumulated similarity indicator based on the similarity indicator and the second similarity indicator.

11. The method of claim 10, further comprising:
determining that the accumulated similarity indicator is greater than a threshold; and
in response to determining that the accumulated similarity indicator is greater than the threshold, transmitting a recommendation for the second item to the particular user.

12. A method comprising:
receiving, by a computing device, information identifying a first item liked by a particular user;
receiving information identifying a second item to be compared with the first item; and
determining an expected number of users, from a plurality of users that like the first item, that will also like the second item based at least in part on a summation of respective probabilities of liking the second item for each of the plurality of users that like the first item;
determining a similarity indicator representing how similar the second item is to the first item, wherein the similarity indicator comprises a ratio of a number of users that previously indicated liking both the first item and the second item to the expected number of users; and
recommending the second item to the particular user based at least on the similarity indicator.

13. The method of claim 12, wherein recommending the second item is responsive to determining that the similarity indicator exceeds a threshold.

14. The method of claim 12, wherein recommending the second item is responsive to determining that the similarity indicator is greater than another similarity indicator representing how much more likely the particular user is to like another item based on liking the first item.

15. The method of claim 12, further comprising:
receiving information identifying a third item;

determining, for the particular user, a second similarity indicator representing how much more likely the particular user is to like the third item based on liking the first item; and determining that the similarity indicator is greater than the second similarity indicator, wherein recommending the second item is responsive to determining that the similarity indicator is greater than the second similarity indicator.

16. The method of claim 12, wherein receiving the information identifying the first item liked by the particular user comprises receiving the information identifying content liked by the particular user in response to a determination that a percentage of the content played is greater than a threshold.

17. The method of claim 16, further comprising determining that the percentage of the content played is greater than 50%.

18. The method of claim 12,
wherein receiving the information identifying the first item liked by the particular user comprises receiving the information identifying a first video viewed by the particular user through a video on demand session, and
wherein receiving the information identifying the second item comprises receiving the information identifying a second video available through a video on demand session.

19. The method of claim 12, further comprising:
receiving information identifying a third item liked by the particular user;
determining, for the particular user, a second similarity indicator representing how much more likely the particular user is to like the second item based on liking the third item; and
determining an accumulated similarity indicator based on the similarity indicator and the second similarity indicator.

20. The method of claim 19, further comprising:
determining that the accumulated similarity indicator is greater than a threshold,
wherein recommending the second item to the particular user based at least on the similarity indicator comprises recommending the second item in response to determining that the accumulated similarity indicator is greater than the threshold.

21. A method comprising:
determining, by a computing device, that a particular user likes a first content item in response to a selection of the first content item;
determining an expected number of users, from a plurality of users that like the first content item, that will also like a second content item based at least in part on a summation of respective probabilities of liking the second content item for each of the plurality of users that like the first content item;
determining a similarity indicator representing how much more likely the particular user is to like the second content item based on liking the first content item, the similarity indicator determined by dividing a number of users that previously indicated liking both the first content item and the second content item by the expected number of users; and
sending a recommendation recommending the second content item to the particular user.

22. The method of claim 21, wherein determining the expected number of users comprises determining a probability ($p(u, x_2)$) that a user (u) will like the second content item ($x_2$) according to:

$$p(u, x_2) = \frac{1}{1 + \frac{I - \|L(u)\|}{\|L(u)\|} \cdot \frac{U - \|L(x_2)\|}{\|L(x_2)\|}},$$

wherein I represents a total number of content items to be considered, L(u) represents a set of content items liked by a respective user, U represents a total number of users to be considered, and $L(x_2)$ represents a set of users that like the second content item.

23. A method, comprising:
determining, by a computing device, a probability of liking a second item for each of a plurality of users that like a first item to obtain a plurality of probabilities;
summing the plurality of probabilities to determine an expected number of users that will also like the second item; and
determining, for a particular user, a similarity indicator representing how much more likely the particular user is to like the second item based on liking the first item, the similarity indicator determined as a ratio of a number of users that previously indicated liking both the first item and the second item to the expected number of users.

24. The method of claim 23, further comprising:
comparing the similarity indicator with a threshold determined based on a number of genres to which the first item belongs; and
transmitting a recommendation suggesting the second item to the particular user based at least on a result of the comparing.

* * * * *

UNITED STATES PATENT AND TRADEMARK OFFICE
CERTIFICATE OF CORRECTION

PATENT NO. : 8,843,430 B2  
APPLICATION NO. : 13/277482  
DATED : September 23, 2014  
INVENTOR(S) : Jojic et al.

Page 1 of 1

It is certified that error appears in the above-identified patent and that said Letters Patent is hereby corrected as shown below:

In the Claims

Column 22, Claim 22, Line 26:

delete "Urepresents" and insert --U represents--

Signed and Sealed this
Thirty-first Day of March, 2015

Michelle K. Lee
*Director of the United States Patent and Trademark Office*